(12) United States Patent
Snead

(10) Patent No.: US 9,290,232 B2
(45) Date of Patent: Mar. 22, 2016

(54) VARIABLE RATE ASSEMBLY FOR A BRAKE SYSTEM FOR BICYCLE

(71) Applicant: SRAM, LLC, Chicago, IL (US)

(72) Inventor: Braden T. Snead, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 14/223,846

(22) Filed: Mar. 24, 2014

(65) Prior Publication Data

US 2015/0266540 A1 Sep. 24, 2015

(51) Int. Cl.
*B62L 3/02* (2006.01)
*B62K 23/06* (2006.01)

(52) U.S. Cl.
CPC *B62L 3/023* (2013.01); *B62K 23/06* (2013.01)

(58) Field of Classification Search
CPC ............ B62L 3/02; B62L 3/023; B62K 23/06
See application file for complete search history.

(56) References Cited

U.S. PATENT DOCUMENTS

| 2,346,758 | A | 3/1941 | Hughes |
| 4,560,049 | A | 12/1985 | Uchibaba |
| 4,865,164 | A | 9/1989 | Kaneda |
| 4,921,081 | A | 5/1990 | Chilcote |
| RE33,578 | E | 4/1991 | Bass |
| 5,050,381 | A | 9/1991 | Matsuno |
| 7,487,638 | B2 | 2/2009 | Tetsuka |
| 7,757,821 | B2 | 7/2010 | Tetsuka |
| 2003/0121736 | A1* | 7/2003 | Lumpkin ................. 188/151 R |
| 2007/0284203 | A1* | 12/2007 | Tetsuka et al. ................ 188/344 |
| 2012/0222416 | A1* | 9/2012 | Hirose et al. .................... 60/594 |

FOREIGN PATENT DOCUMENTS

| DE | 202014100854 U1 * | 6/2014 |
| EP | 1439116 | 7/2004 |
| EP | 1864903 A2 | 12/2007 |
| JP | 10-230886 | 9/1998 |
| WO | 2005/087574 | 9/2005 |
| WO | 2007/128058 A1 | 11/2007 |
| WO | WO 2008056379 A1 * | 5/2008 |
| WO | WO 2012143258 A2 * | 10/2012 |

OTHER PUBLICATIONS

Machine Translation of DE 202014100854U1.*

* cited by examiner

*Primary Examiner* — Anna Momper
(74) *Attorney, Agent, or Firm* — Milan Milosevic; Lisa Serdynski

(57) ABSTRACT

A brake assembly for a hydraulic brake system of a handlebar-steered vehicle, the brake assembly including a housing mountable to a handlebar of the vehicle and having a chamber formed therein. The brake assembly is provided with a variable rate linkage. A piston assembly is received and axially guided within the chamber and is provided with a piston adjustment mechanism that does not affect the function of the variable rate linkage.

25 Claims, 9 Drawing Sheets

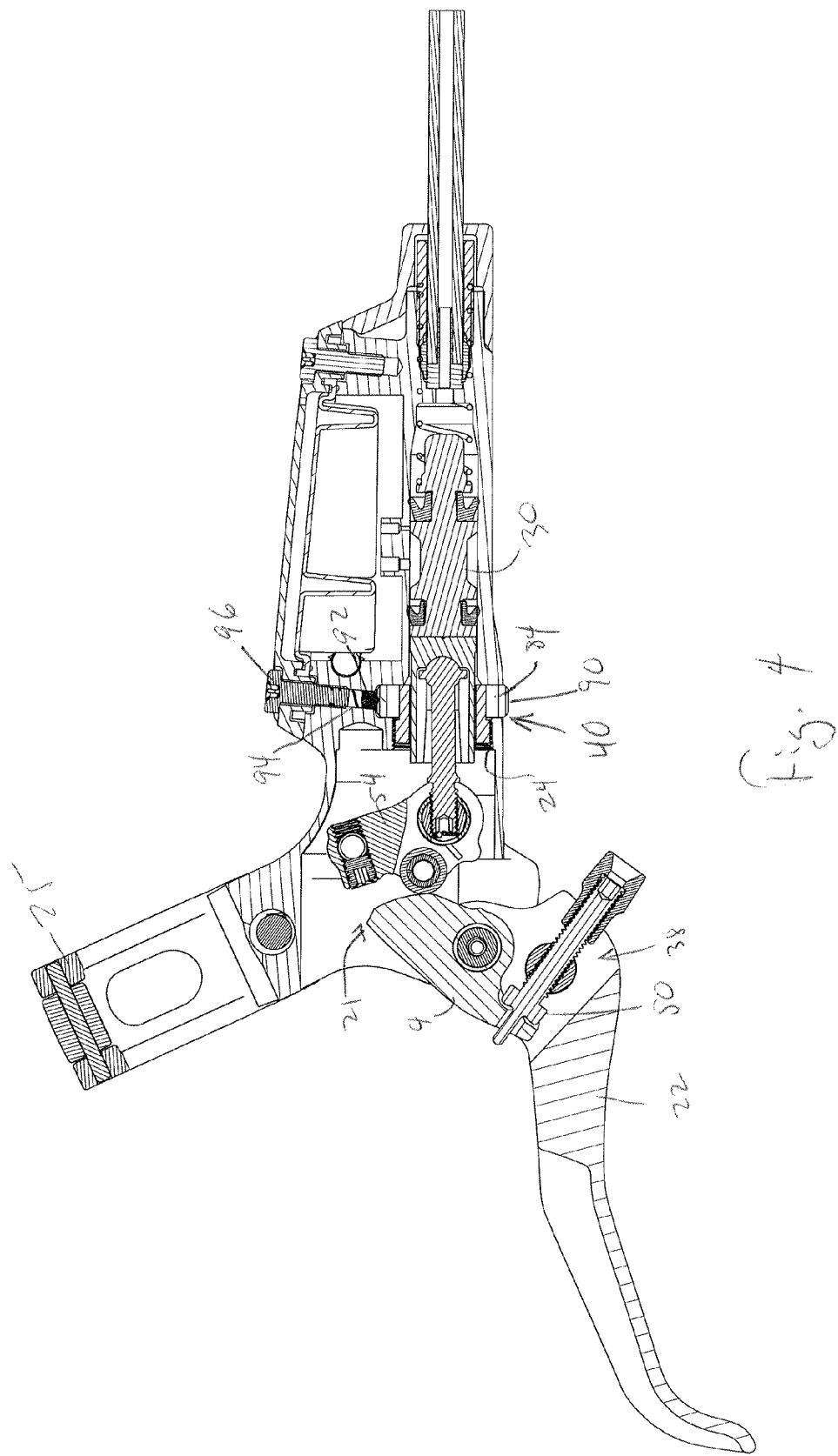

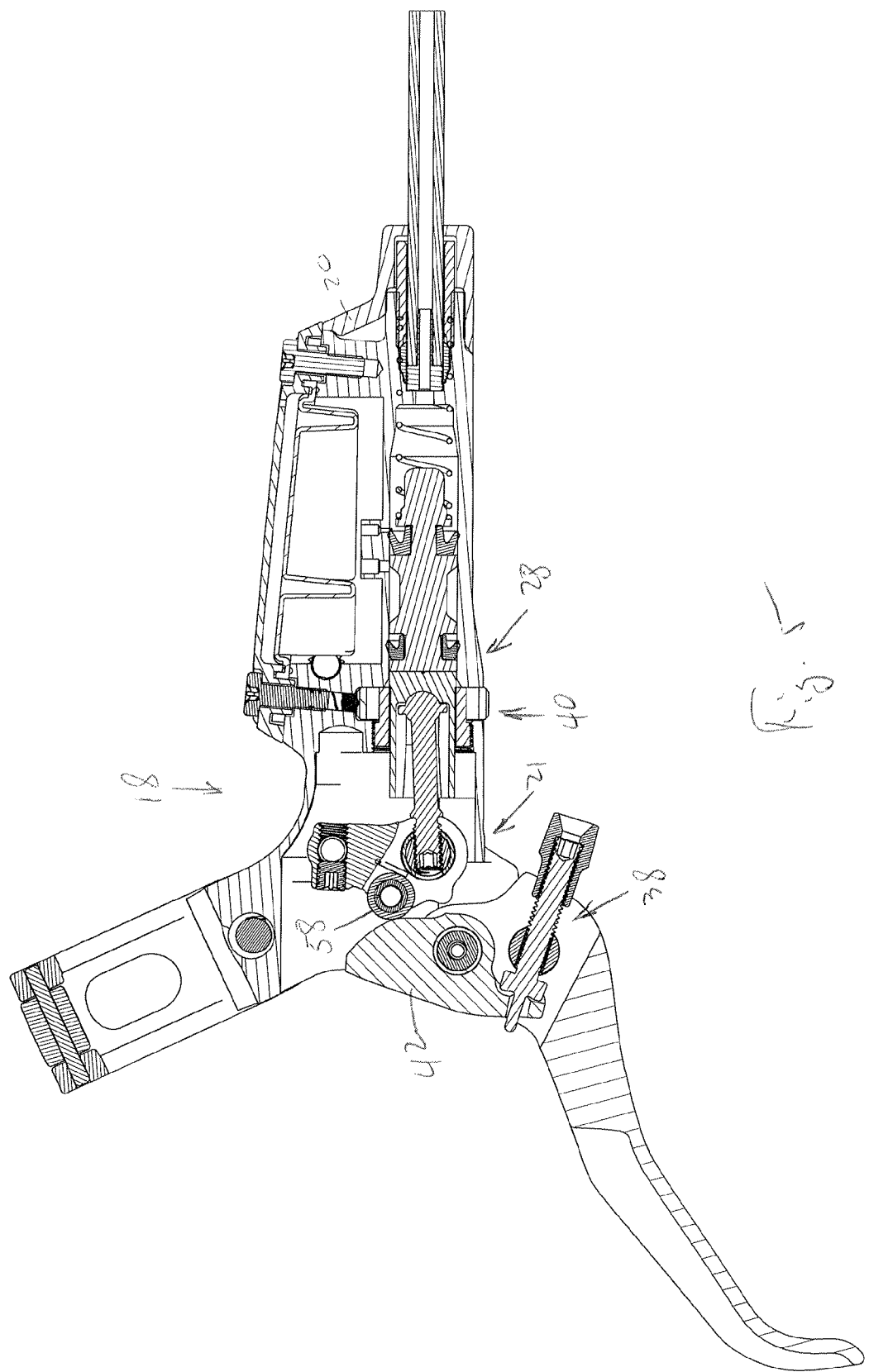

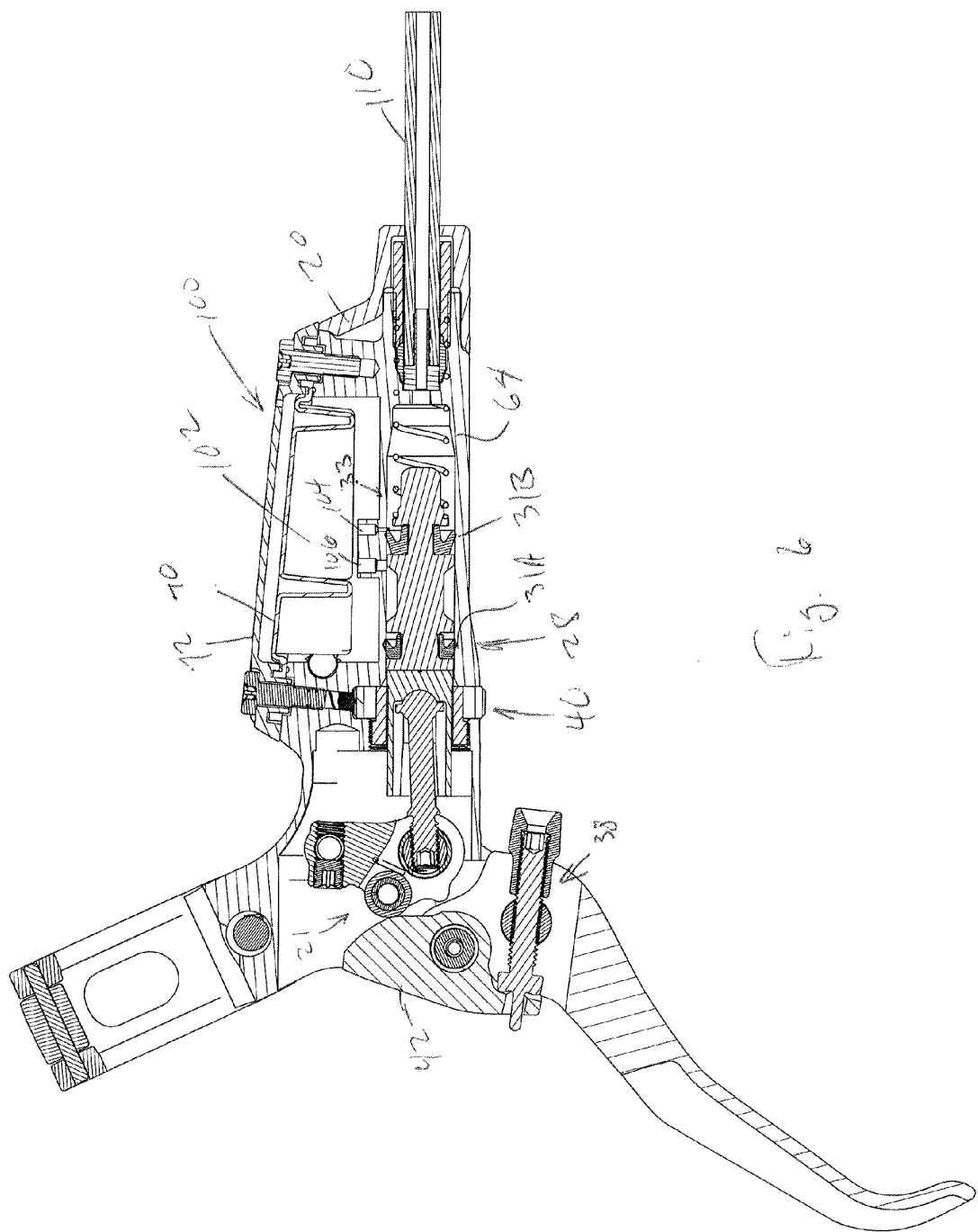

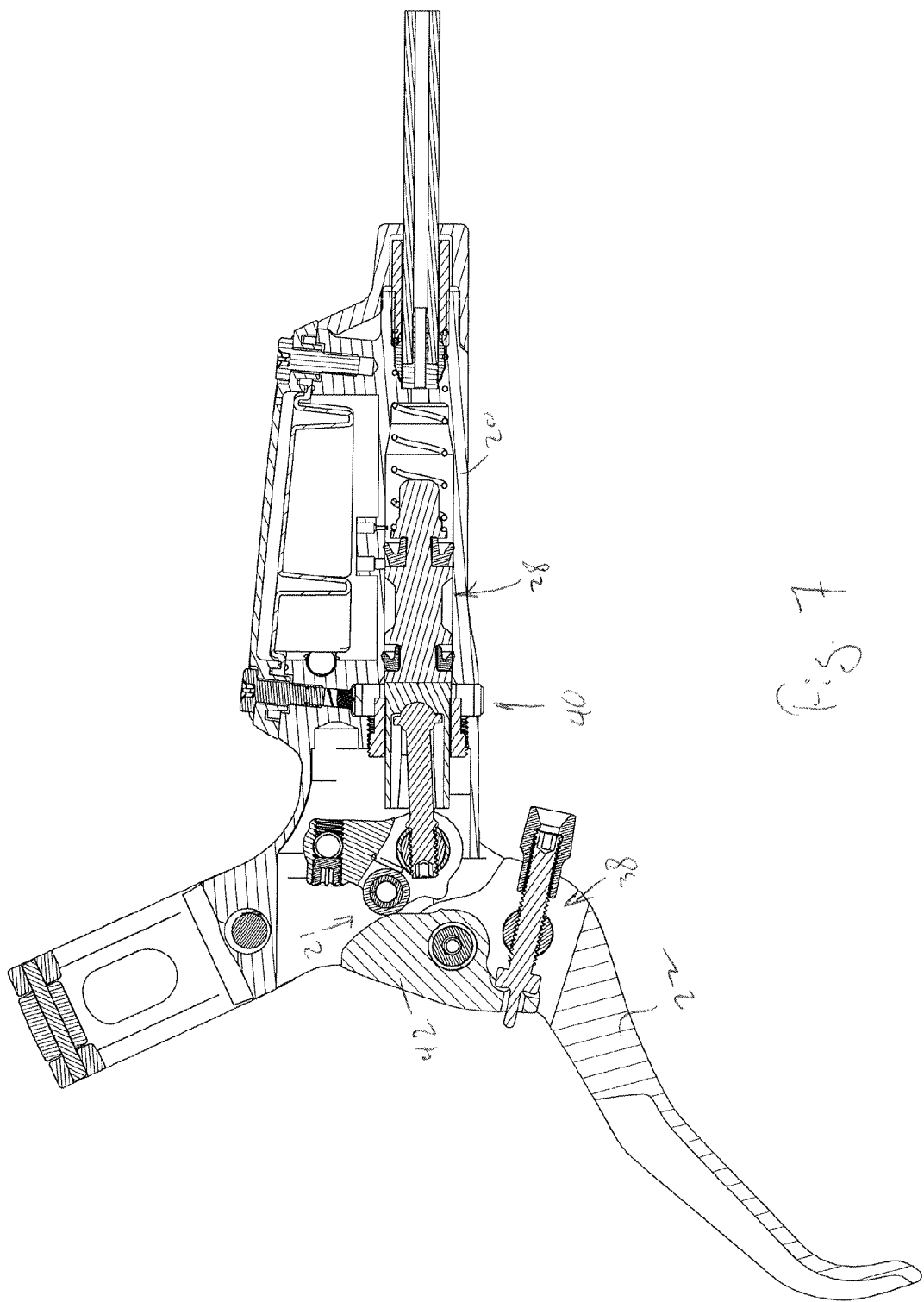

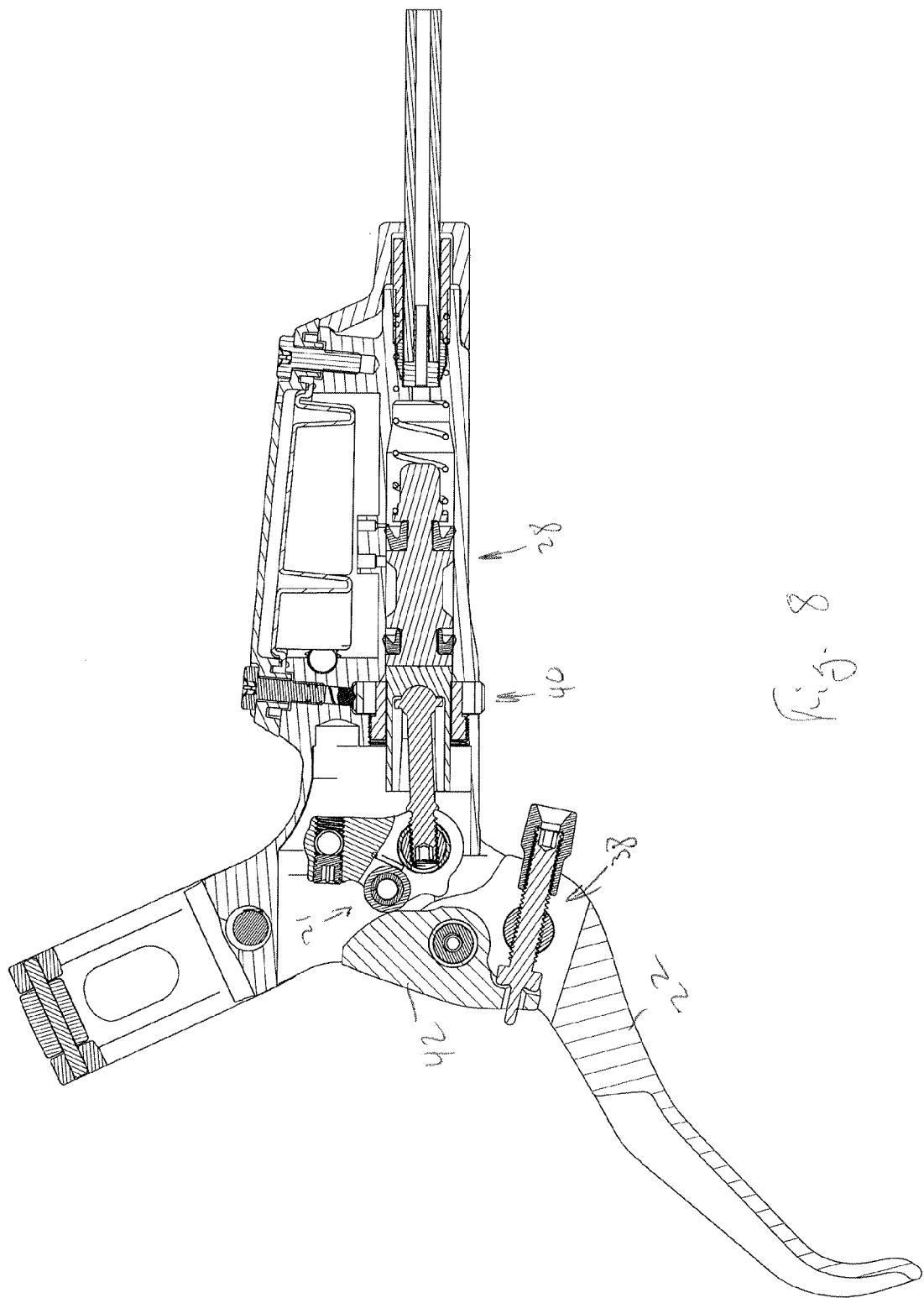

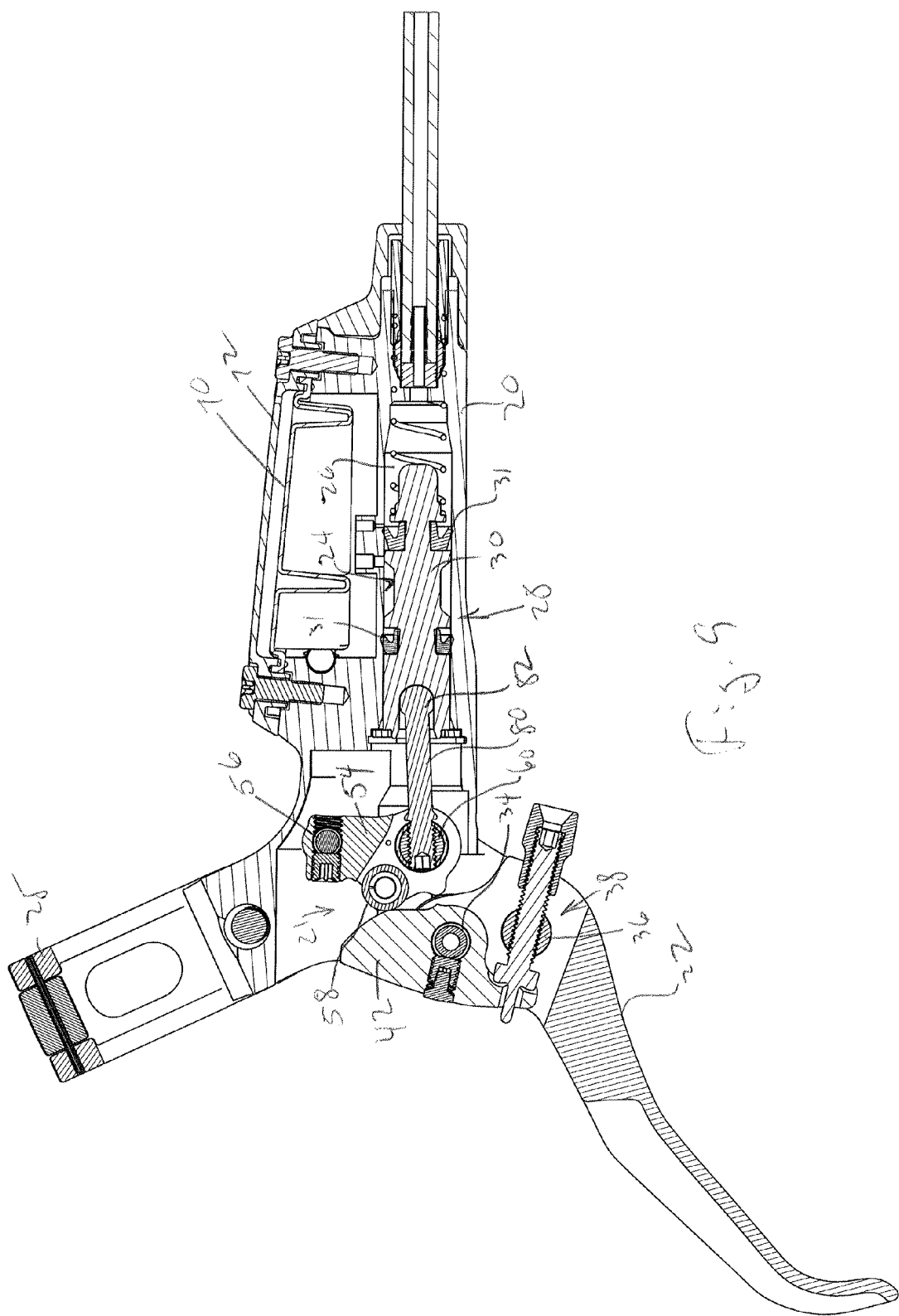

VARIABLE RATE ASSEMBLY FOR A BRAKE SYSTEM FOR BICYCLE

BACKGROUND OF THE INVENTION

A hydraulic brake system for a bicycle typically includes a hydraulic brake actuation device, a rotor attached to a wheel of the bicycle and a brake caliper operatively connected to the brake actuation device. The caliper is responsive to changes in hydraulic pressure generated by the brake actuation device to urge brake pads into contact with the rotor and effect braking.

When the brake actuation device is initially actuated, no braking forces are generated because a gap must be closed between the brake pads and the rotor. Typical hydraulic brake systems that have a linear rate of travel of the piston relative to the travel of the lever blade require an undesirable amount of lever travel before braking occurs, i.e., a significant amount of "dead band." Most hydraulic brake systems do not address dead band and changes in dead band from pad wear, and except for set-up procedures, there have been few efforts to develop mechanisms that are adjustable to provide a minimal gap and without affecting the rate of travel of the piston relative to the brake lever. Furthermore, especially in systems with a variable rate of travel of the brake system piston relative to the lever travel, it would be desirable to adjust the dead band without affecting the performance of the system related to the variable rate of the brake system.

There is a demand, therefore, to minimize dead band without the number of parts, weight and the expense of a complicated mechanism, and without degrading brake performance. The invention satisfies the demand with the additional benefits of lighter weight and reduced manufacturing cost.

SUMMARY OF THE INVENTION

The invention provides linkages for a brake system, for example, in a hydraulic brake system for a bicycle. The invention relates to an assembly for brake actuation systems for bicycles and includes a variable rate linkage brake arrangement and lever preferably providing one or more of the following objects: 1) increased pad/brake surface gap, 2) increased end of stroke brake force, and 3) improved modulation and control, and 4) adjustability of the gap without affecting the selected variable rate of action of the linkage.

The movement of the linkage according to an aspect of the invention creates a changing, i.e., variable lever blade stroke per piston actuation rate. This rate can be tuned to allow for greater initial fluid movement and subsequently increased pad/rotor clearance for the same lever blade stroke. The rate can also be tuned to have increased brake force at the end of the lever blade stroke. Modulation and brake control can be tuned to a desired brake force in the beginning, middle, and ending ranges of the lever blade stroke with the advantage of increased brake performance. Tuning the linkage also preferably provides a reduction in eccentric piston loading.

Among other features, the invention may provide a variable lever pull/master piston actuation rate for increased end-of-stroke power, variable lever pull/master piston actuation rate for reduced initial brake force, variable lever pull/master piston actuation rate for greater fluid capacity for increasing pad/rotor clearance for the same lever stroke, variable lever pull/master piston actuation rate tuned to a desired brake force in the beginning, middle, and ending ranges of the lever blade stroke with the advantage of increased brake performance. The invention provides reduced complexity and part count over the prior art for reduced brake system weight and reduced complexity and part count over prior art for reduced manufacturing cost. Moreover, the invention provides a mechanism for adjusting the dead band of the lever without affecting the desired variable lever piston actuation rate by changing the rest position of the piston.

The invention provides a brake assembly for a hydraulic brake system of a handlebar-steered vehicle, the brake assembly including a housing mountable to a handlebar of the vehicle and having a fluid chamber formed therein. A piston assembly is received and axially guided within the fluid chamber. A lever is pivotally attached to the housing. A cam link is provided on the lever. A follower link is pivotally attached to the housing, wherein movement of the lever moves the cam link and the follower link, wherein the cam and follower links interact to produce a variable rate of travel of the piston assembly relative to the travel of the lever and a pushrod is disposed between the follower link and the piston assembly.

Other aspects of the invention provide a brake assembly wherein the lever and cam link may both pivot on a common pivot. The follower link may have a first end that is pivotally disposed about a housing pivot and the pushrod is threadably attached to the follower link on a second end. The cam link may include a cam surface. The follower link may include a roller positioned to contact the cam surface. The follower link may have a first end that is pivotally disposed about a housing pivot and the pushrod is threadably attached to the follower link on a second end. The roller may be positioned between the first and second ends of the follower link. The piston assembly may include a piston disposed in a bore of the housing. The fluid chamber may be defined by the wall of the bore and the piston. The piston assembly may include a cap member positioned between the pushrod and the piston. The cap member may include an interior into which the pushrod keys, the pushrod rotationally fixed to the cap member. The cap member may abut the piston at an end portion thereof, the cap member end portion including a flange. The assembly may further include a piston adjustment mechanism disposed in the housing, the piston adjustment mechanism including a manually movable member positioned about and keyed to the piston assembly, wherein the movable member moves axially to adjust a rest position of the piston assembly in the bore without affecting the variable rate of travel of the piston. The manually movable member may be manually rotatable and moves axially when rotated. The piston assembly may include a cap member that abuts a piston at an end portion thereof, the cap member end portion including a flange. The movable member of the position adjustment mechanism may contact the flange of the cap member and wherein adjustment of the position of the movable member in the housing causes adjustment of the rest position of the piston assembly. The movable member may be threadably engaged with the housing. The pushrod may be threadably engaged to the follower link. The pushrod may be keyed to the piston assembly wherein a thread pitch of the movable member to the housing matches a thread pitch of the pushrod in the follower link such that when the piston assembly position is adjusted by rotation and axial movement of the position adjustment mechanism the pushrod is moved an equal amount in the same direction to retain contact with the piston assembly. The piston adjustment mechanism may include a detent mechanism disposed in the housing that acts on the movable member of the piston adjustment mechanism. The detent mechanism may be a ball detent. The piston adjustment mechanism may include a manually operated dial keyed to the rotatable member and the ball detent acts upon a non-round exterior of the dial of the piston adjustment mechanism. The cam link may be formed as a single piece with the lever or may be pivotally attached to the lever.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 4 is a sectional view of a brake assembly in a pulled or actuated position;

FIG. 5 is a sectional view of a brake assembly with a reach adjust mechanism adjusted to be in an inward orientation;

FIG. 6 is a sectional view of a brake assembly with the reach adjust mechanism adjusted to be in an outward orientation;

FIG. 7 is a sectional view of a brake assembly with a piston adjustment assembly adjusted to provide a larger amount of dead band;

FIG. 8 is a sectional view of a brake assembly with a piston adjustment assembly adjusted to provide a smaller amount of dead band; and FIG. 9 is a sectional view of a brake assembly with a variable rate linkage including a cam link and a follower link.

DETAILED DESCRIPTION OF THE PREFERRED EMBODIMENTS

Preferred embodiments of the invention will herein be described with reference to the drawings. It will be understood that the drawings and descriptions set out herein are provided for illustration only and are not for the purpose of limiting the invention as defined by the claims appended hereto and any and all their equivalents.

In the following, the construction of a brake assembly is described, which according to an embodiment may be constructed or arranged to operate an otherwise conventional hydraulic brake system (not shown). In the described embodiment, in its most general form, the invention provides a brake assembly and system constructed to produce a desired variable lever ratio, i.e., one that is non-linear, which will be described in detail hereinbelow. Also, the invention contemplates the provision of a mechanism to adjust the dead band in the assembly without affecting the desired non-linear nature of the brake assembly. The inventive brake assembly may be used on any type of hand operated brake for bicycles, motorcycles, three and four-wheelers, for example. For bicycles, variations are possible for road style brake levers, different styles of mountain bike brake levers, or BMX brake levers. Other applications could include hydraulic clutch systems.

Figure 1:
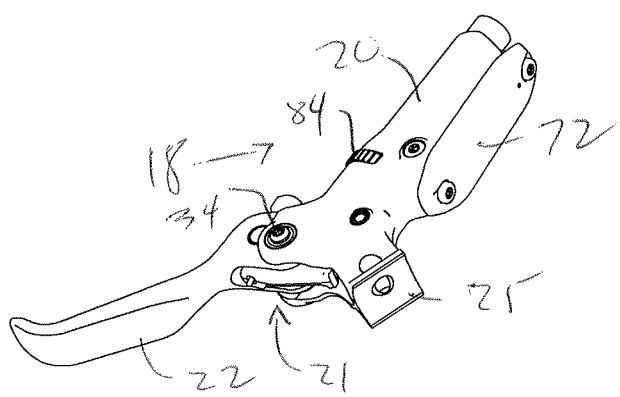
FIG. 1 is an assembled brake assembly according to the invention.
Figure 2:
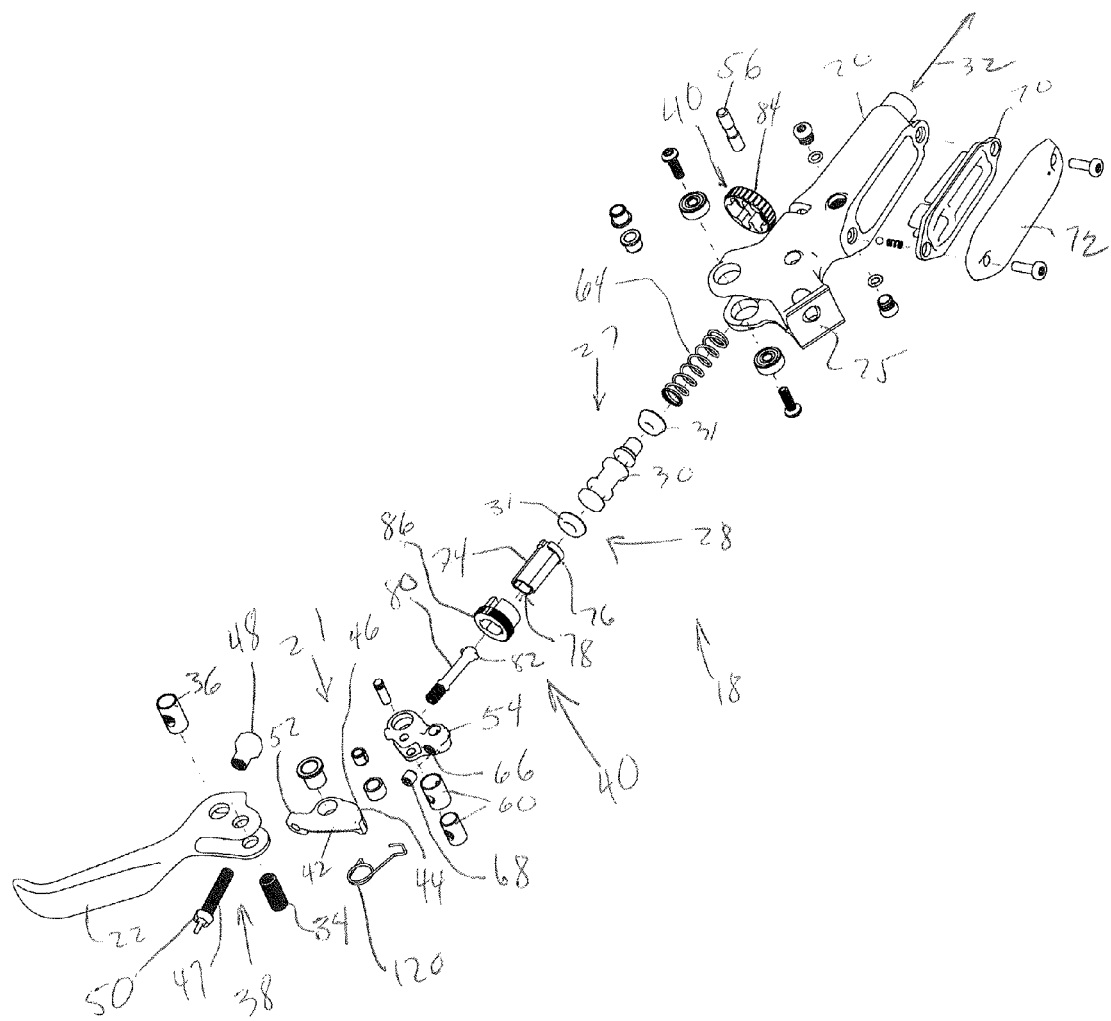
FIG. 2 is an exploded view of a brake assembly according to the invention.
Figure 3:
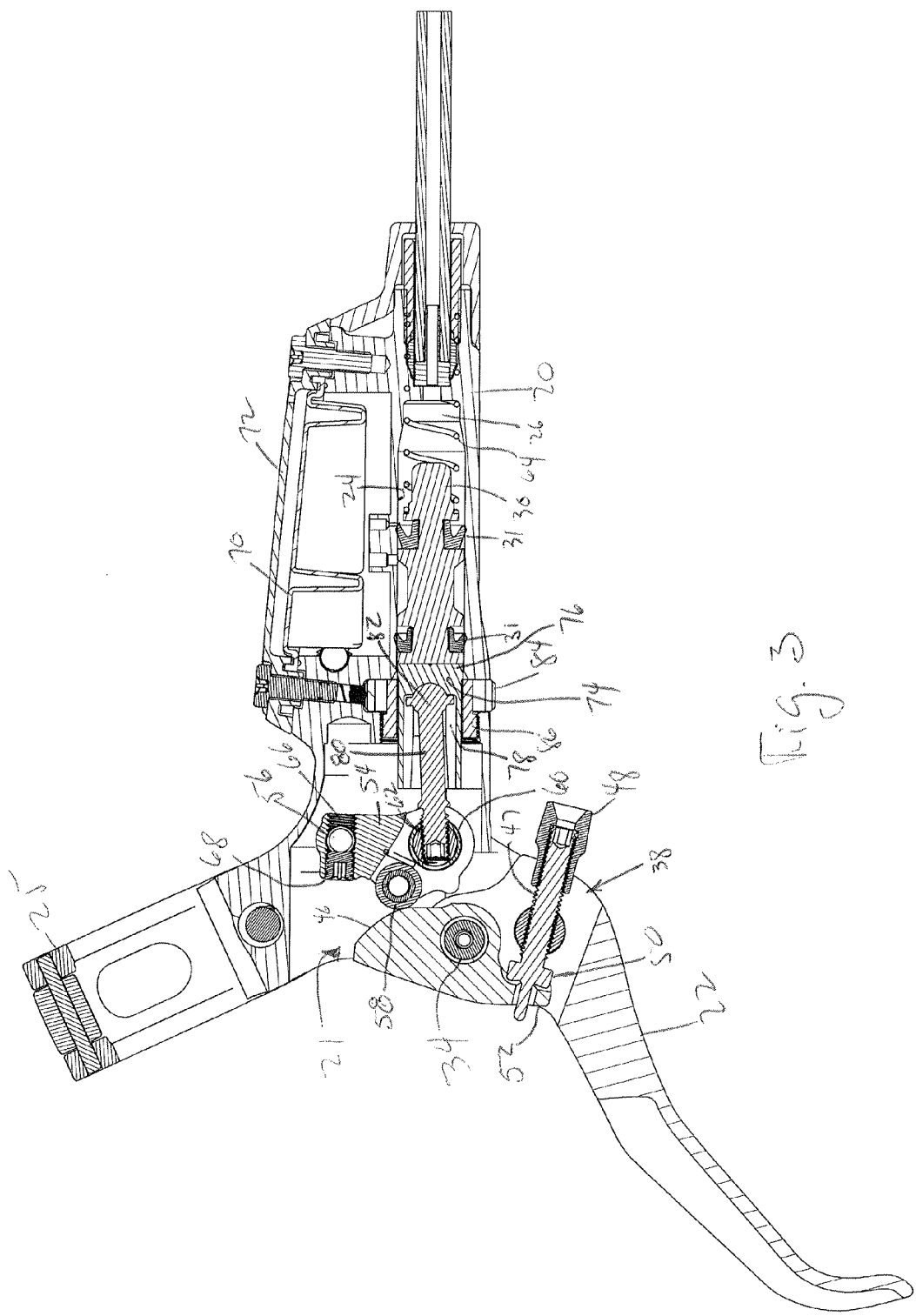
FIG. 3 is a sectional view of a brake assembly in a rest or home position.

Turning to FIGS. 1-8, the brake assembly 18 includes a housing 20. The brake assembly 18 includes a lever 22 pivotally attached to the housing 20. The lever 22 may include a lever adjustment mechanism 38. The housing 20 includes a bore 24. A piston assembly 28 is reciprocally disposed within the bore 24. The bore 24 includes a fluid chamber 26. A linkage 21 operates between the lever 22 and the piston assembly 28 to produce a variable rate of travel of the piston assembly. An optional piston adjustment mechanism 40 operates between the linkage 21 and the piston assembly 28 to adjust the amount of dead band in the system without affecting the operation of the linkage 21. A clamp device 25 or any suitable fastening means may be part of or attached to the housing 20 for attaching the housing to a handlebar of a bicycle (not shown), for example. FIG. 9 shows the brake assembly of FIGS. 1-8 and is an embodiment that omits the piston adjustment mechanism.

The lever 22 may be in the form of a blade pivotally attached to the housing 20 of the brake assembly 18 by a first pin or pivot 34. A cam or cam-shaped link 42, which is part of one embodiment of the linkage 21, is either formed as part of the lever 22 or pivotally disposed on the first pin 34. The cam 42 has a cam-shaped surface 44 along one portion 46.

A lever adjusting mechanism 38 may be adustably attached to the lever 22 on a second pin or pivot 36, with the second pin attached to the lever. The second pin 36 may be generally outboard from the first pin 34.

The lever adjusting mechanism 38 may include a threaded shaft 47 threadably engaged with the second pin 36. One end of the lever adjusting mechanism 38 includes a grasping part 48 that is accessible and manipulatable by a user and the other end of the lever adjusting mechanism 38 includes a flared end or stop 50. The stop 50 abuts the cam 42 at the end 52 generally opposite the cam surface 44. Twisting the grasping part 48 causes the shaft 47 to either be inserted farther or removed from its engagement with the second pin 36, and as a result change the distance between the second pin 36 and the adjustment end of the cam 52. In this manner, the orientation of the cam 42 on the lever 22 can be changed, and the position of the lever is altered relative to a handlebar (not shown) when mounted thereon or the housing 20.

The linkage 21 also includes a follower 54. The follower 54 is pivotally disposed on the housing 20. The follower 54 may be disposed on a third pin or pivot 56 attached to the housing 20. The follower 54 includes a fourth pin 60, which is located opposite the third pin 56. The fourth pin 60 may include a threaded bore 62. The follower 54 may include a roller 58, which is rotatably disposed between the third pin 56 and the fourth pin 60. The roller 58 engages the cam surface 44 of the cam link. The interaction of the follower 54 and the cam 42 when the lever 22 is moved causes the piston assembly 28 to travel according to the profile of the cam surface 44. The position of the roller 58 on the cam surface 44 determines the part of the profile of the cam surface actuating the piston assembly 28 in response to movement of the lever 22. The follower 54 may be secured to the third pin 56 with a locknut 68.

The housing 20 may be any suitable shape that can define a hollow interior including a bore 24, and accommodates the mounting of and operation of the linkage 21. The housing 20 may be made of any suitable material, for example, metal, plastic, composite materials or combinations thereof. The bore 24 includes a fluid chamber 26. The fluid chamber 26 includes brake fluid as is known.

The illustrated brake assembly 18 is known as an "open" type of fluid system. The assembly 18 includes a "backpack" reservoir 100. The backpack reservoir 100 includes a reservoir chamber 102 defined in a portion of the housing 20 in communication with the fluid chamber 26. Extending through the bore wall 33 between the reservoir chamber 102 is a timing port 104 and a compensating port 106. A diaphragm or seal 70 made of an elastomeric material such as silicon rubber is made to cover the reservoir chamber 102.

The basic operation of the brake assembly 18 is well understood by those skilled in the art. Pivoting the lever 22 from a rest position causes the piston assembly 28 to drive the piston into the bore 24. As the piston inwardly, the cup or umbrella seal 31 covers the timing port 104 which pressurizes the fluid within the hydraulic line 110 at the end of the fluid chamber 26 and which in turn actuates a slave cylinder within a hydraulically coupled brake caliper (not shown). When the lever 22 is released, the compression spring 64 biases the piston 30 toward the first end of the fluid chamber 26 to reassume the rest or home position. The distance between the cup seal 31 and the timing port 104 is referred to as the "dead-band." During the part of lever actuation where the cup seal 31 is between the timing port 104 and the first end of the fluid chamber 26, fluid in the reservoir 102 between the seal 31 and the timing port 104 returns to the reservoir 102, perhaps causing expansion of the diaphragm 70. During this part of lever actuation, the second end of the fluid chamber 26 cannot be pressurized. It is highly desirable to be able to adjust the length of the dead-band in accordance with user preferences.

A piston assembly 28 is disposed in the bore 24 and fluid chamber 26. The piston assembly 28 may include a piston 30 positioned at one end thereof, e.g., at or near a distal end 27 of the assembly, which piston may be provided with one or more seal 31. The seal 31 sealingly engages the wall 33 of the bore 24 at predetermined positions within the fluid chamber 26 and reciprocates therein. The seal 31 may be one or more O-rings, for example, or umbrella seals, for example. Where two seals 31 are used, the rearmost 31A of the two seals (31A, 31B) may be considered to define with the piston 30 and the wall 33 of the bore 24 the fluid chamber 26, i.e., the volume of the bore that includes fluid.

The piston assembly 28 is constructed and positioned within the bore 24 to reciprocate along a piston assembly axis 32. The piston assembly 28 is preferably biased in a rest or home position by a piston assembly biasing element 64, which may be a spring, such as a coil spring as shown. The action of the biasing element 64 may also return the lever 22 to a rest or home position.

The piston assembly 28 may include a separate cap member 74. The cap member 74 may be a barrel shaped piece that fits within the bore 24 and abuts the proximal end of the piston 30. The cap member 74 includes a flange 76 or the like at or near the end abutting the piston. The cap member 74 may also include a non-round interior 78 that may in the form of a key hole or the like.

A pushrod 80 is connected to the follower 54 at one end and contacts the piston assembly 28 at the other end. The pushrod 80 includes a head 82. The head 82 includes a ball surface received in a corresponding interior 78 of the cap member 74 of the piston assembly 28 in a keyed relationship. The pushrod 80 may be threaded engaged with a threaded bore 62 of the fourth pin 60 at an end opposite the head 82.

The piston assembly 28 can be a single-piece as shown or formed as multiple pieces. In one example contemplated by the invention, the piston 30 may be a separate part of the assembly 28. Alternatively, the piston 30 may be formed as a single-piece construction with the cap member 74.

The linkage 21 is operated by movement of the lever 22, which in turn causes the piston assembly 28 to move and generate fluid pressure within the fluid chamber 26. In the illustrated example, the linkage 21 includes a cam link member 42 attached to the lever 22 and a follower link member 54 attached to the housing 20.

In a hydraulic system, the fluid chamber 26 will be connected to a remote slave cylinder (not shown) which operates the hydraulic brake system through a hydraulic line to effect the application of fluid pressure on a brake component such as a disc brake or the like in a known manner.

The brake assembly may include a piston adjustment mechanism 40 that is disposed in the housing 20. The piston adjustment mechanism 40 includes a sleeve member 86 that is disposed about and keyed to the cap member 74. The sleeve member 86 is also threadably engaged in the bore 24 of the housing 20. The sleeve member 84 may be turned by a manually movable member 84 that is keyed to the sleeve member. The movable member 84, when rotated, causes axial movement of the sleeve member 86 and movement of the sleeve member causes axial movement of the cap member 74 through interaction of the sleeve member with the flange 76 of the cap member. At the same time that the sleeve member 86 is moved axially, the pushrod 80 is translated axially the same amount and in the same direction as the cap member 74 by the threaded engagement of the pushrod in the fourth pin 60. In this way, no slack or lash is created by adjustment of the dead band with the piston adjustment mechanism 40. Also, the positions of the elements of the linkage 21 are unaffected.

A biasing spring 120 (FIG. 2) is positioned between the lever blade 22 and the lever body housing 20. This spring 120 applies a torsional load between the lever 22 and the housing 20. The purpose is to maintain the components of the brake and adjustment mechanisms in contact with each other. Without spring 120, the components would be loose inside the lever and housing 20.

A ball detent mechanism 88 disposed in the housing 20 may be used to retain the dial 84 in position. The ball detent mechanism 88 includes a ball 92 urged against the dial 84 by a spring 94. The ball detent mechanism 88 is held in the housing 20 by a screw 96 or the like. The dial 84 may have exterior features 90 formed on the outside thereof that interacts with the ball 92 to resist unintended rotation thereof.

As a result of the arrangement of link members and the shape of the cam surface 44, the elements of the linkage 21 creates a variable or changing lever blade stroke relative to the piston actuation rate. Beneficially, by altering the positional interaction of the links, this rate can be tuned to be initially higher than a conventional linear brake system and then, near the end of the lever blade stroke tuned to be at or lower than the rate of a conventional brake system. The variable rate linkage of the invention thus yields increased brake performance in accordance with a number of braking aspects. A benefit to the changing or variable rate system according to embodiments of the invention is a decreased initial brake/surface force that increases as the lever is further actuated. A brake system can thus be tuned to have less initial "bite" upon first contact of the pads to the brake surface, have moderate brake force through the mid-stroke, and then have the maximum brake force at higher user hand forces. This allows for greater control and predictability by the user. Also, the dead band of the system can be adjusted by the user without affecting the operation, performance and feel of the brake rate provided by the linkage according to the invention.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A brake assembly for a hydraulic brake system of a handlebar-steered vehicle, the brake assembly comprising:
   a housing mountable to a handlebar of the vehicle and having a fluid chamber formed therein;
   a piston assembly received and axially guided within the fluid chamber;

a lever pivotally attached to the housing;
a cam link on the lever;
a follower link pivotally attached to the housing, wherein movement of the lever during a brake actuation lever stroke moves the cam link and the follower link relative to each other, wherein the cam and follower links interact to produce a variable rate of travel of the piston assembly relative to the travel of the lever during the brake actuation lever stroke; and
a pushrod disposed between the follower link and the piston assembly.

2. The brake assembly of claim 1, wherein the lever and cam link both pivot on a common pivot.

3. The brake assembly of claim 2, wherein the follower link has a first end that is pivotally disposed about a housing pivot and the pushrod is threadably attached to the follower link on a second end.

4. The brake assembly of claim 1, wherein the cam link includes a cam surface.

5. The brake assembly of claim 4, wherein the follower link includes a roller positioned to contact the cam surface.

6. The brake assembly of claim 5, wherein the lever and cam link both pivot on a common pivot.

7. The brake assembly of claim 6, wherein the follower link has a first end that is pivotally disposed about a housing pivot and the pushrod is threadably attached to the follower link on a second end.

8. The brake assembly of claim 7, wherein the roller is positioned between the first and second ends of the follower link.

9. The brake assembly of claim 1, wherein the piston assembly includes a piston disposed in a bore of the housing.

10. The brake assembly of claim 9, wherein the fluid chamber is defined by the wall of the bore and the piston.

11. The brake assembly of claim 9, wherein the piston assembly includes a cap member positioned between the pushrod and the piston.

12. The brake assembly of claim 11, wherein the cap member includes an interior into which the pushrod keys, the pushrod rotationally fixed to the cap member.

13. The brake assembly of claim 11, wherein the cap member abuts the piston at an end portion thereof, the cap member end portion including a flange.

14. The brake assembly of claim 1, further comprising:
a piston adjustment mechanism disposed in the housing, the piston adjustment mechanism including a manually movable member positioned about and keyed to the piston assembly, wherein the movable member moves axially to adjust a rest position of the piston assembly in the bore without effecting the variable rate of travel of the piston.

15. The brake assembly of claim 14, wherein the manually movable member is manually rotatable and moves axially when rotated.

16. The brake assembly of claim 14, wherein the piston assembly includes a cap member that abuts a piston at an end portion thereof, the cap member end portion including a flange.

17. The brake assembly of claim 16, wherein the movable member of the piston adjustment mechanism contacts the flange of the cap member and wherein adjustment of the position of the movable member in the housing causes adjustment of the rest position of the piston assembly.

18. The brake assembly of claim 17, wherein the movable member is threadably engaged with the housing.

19. The brake assembly of claim 18, wherein the pushrod is threadably engaged to the follower link.

20. The brake assembly of claim 19, wherein the pushrod is keyed to the piston assembly and wherein a thread pitch of the movable member to the housing matches a thread pitch of the pushrod in the follower link such that when the piston assembly position is adjusted by rotation and axial movement of the piston adjustment mechanism the pushrod is moved an equal amount in the same direction to retain contact with the piston assembly.

21. The brake assembly of claim 14, wherein the piston adjustment mechanism includes a detent mechanism disposed in the housing that acts on the movable member of the piston adjustment mechanism.

22. The brake assembly of claim 21, wherein the detent mechanism is a ball detent.

23. The brake assembly of claim 22, wherein the piston adjustment mechanism includes a manually operated dial keyed to the rotatable member and the ball detent acts upon a non-round exterior of the dial of the piston adjustment mechanism.

24. The brake assembly of claim 1, wherein the cam link is formed as a single piece with the lever.

25. The brake assembly of claim 1, wherein the cam link is pivotally attached to the lever.

* * * * *